Nov. 24, 1959 P. D. ROBINSON 2,913,823
ELLIPSOGRAPH
Filed Jan. 14, 1958

INVENTOR.
PAUL D. ROBINSON
BY
Charles R. Fay, atty.

United States Patent Office 2,913,823
Patented Nov. 24, 1959

2,913,823
ELLIPSOGRAPH
Paul D. Robinson, Worcester, Mass.

Application January 14, 1958, Serial No. 708,875

8 Claims. (Cl. 33—30)

Technically, an ellipse is "the line bounding an oblique cut of a frustum of a cone." To those skilled in the art, it is well known that an ellipse is actually a fore-shortened circle, or a circle viewed at an oblique angle (not an "oval," meaning "egg-shaped"), and that if a circle be rotated about its horizontal diameter (major axis), the ellipticity increases while the vertical diameter (minor axis) decreases until at 90° of rotation the circle becomes a straight line (minor axis zeroed), i.e. all between these extremes are ellipses.

A perfect instrument for drawing ellipses is one capable of describing all degrees of ellipses from a circle to a straight line. With the employment of the principles of this invention, these specifications are completely met. In this novel instrument, a small diameter center post is employed for convenience of operation, this diameter being shorter than the axes of all practical ellipses. Without deviating from the original and unique features of this invention, by employing a stand outside the periphery of the ellipse (to eliminate the center post), it can be readily seen that even a straight line can be drawn.

Be it further understood that (although the method of obtaining motion of the parts herein used is by spur gear train and wedge setting) miter or bevel gears, rack and pinion, chain, belt, friction wheels or any other of the well known elements of motion may be utilized and yet not depart from the broad scope of the invention.

While the accompanying drawings and description contain the embodiment of my invention, it is understood that changes in materials, construction and proportions may be desirable but will not affect the invention's basic features but will retain the essential characteristics thereof which are hereby illustrative but not restrictive.

Whereas, with a bow compass for drawing a circle, as there is but one radius, so there is but one adjustment nut for setting the scriber at the end of the radius. Therefore, with an ellipsograph for drawing an ellipse, as there are two radii, so there should be but two adjustment nuts, one for setting the scriber at the end of the minor radius and one for setting the same scriber at the end of the major radius.

The new and simplified instrument employs several new features for setting to completely scribe ellipses of all proportions (without the use of a trammel), with but one set nut for the minor axis and one for the major axis. The instrument is so constructed that circles of varying diameters may also be drawn by turning only the minor axis set nut to desired radius, and with no additional adaptor.

The operation of this instrument is basically similar to that of a compass having a center post about which a scriber revolves.

Other objects and advantages of the invention will appear hereinafter.

Reference is to be had to the accompanying drawings, in which

Figure 2:
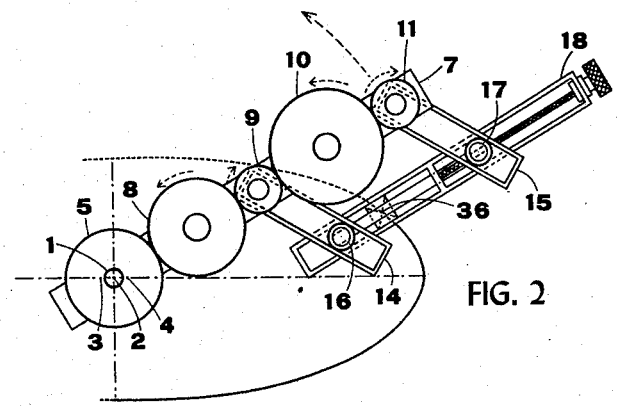
Fig. 2 is a plan view showing diagrammatically the uniformly varying motion during the kinematic cycle, and the relative action of frame arm, gearing, crank arms, scriber arm and scriber while drawing a determinate ellipse.

A center post 1 has at its base, and fast thereto, a center locating pin 2 set at the intersection of the major and minor axes, and holding pins 3 and 4 which are spaced from the center on the major axis just a sufficient distance to prevent the center post from turning. At the top of the center post, there is a fixed knurled finger knob 38 by which the center post is held from turning. Also fixed to the center post is a spur sun gear 5. Mounted on and to revolve around the center post is a knurled finger-operated cylinder 6 which is fixed to and turns a frame arm 7 around the center post. Frame arm 7 contains four planet epicyclic train spur gears 8, 9, 10 and 11 to turn about, and relative to, the stationary sun gear 5.

Meshing with sun gear 5 is an idle gear 8 which meshes with driving gear 9 having one-half the teeth of sun gear 5 and which meshes with idle gear 10 meshing with driving gear 11, also having one-half the teeth of sun gear 5. There are a pair of shafts 12 and 13 fixed to gears 9 and 11 respectively co-axially thereof.

During one complete turn of the frame arm 7 about the center post (the arm to turn in either direction, for example, counterclockwise), shafts 12 and 13 will make two complete turns clockwise, but only one complete turn in relation to the center post.

Fixed to shaft 12 is a throw crank 14, and correspondingly fixed to shaft 13 is a throw crank 15. Carried by throw crank 14 is a vertical shaft 16. Carried by throw crank 15 is a vertical shaft 17. When shaft 16 is in direct alignment with shaft 12 (axis of gear 9), shaft 17 is also in direct alignment with shaft 13 (axis of gear 11). In this position, any rotation of throw cranks 14 and 15 will not affect the scriber 36 which will then scribe a circle. (This position is called "neutral position.")

Connected to throw cranks 14 and 15 is the scriber arm 18. This connection is by two circular bearing studs 19 and 20. Stud 19 is a tubular stud through which shaft 16 is free to rise and fall. It also has a groove and flange construction to permit and guide its travel horizontally along a slotted bottom plate 21 of the throw crank 14, and a similar construction permits the scriber arm 18 to travel an equal distance along a horizontally slotted top plate 22. The groove in stud 19 permits throw crank 14 to turn around shaft 16.

The circular stud 20 permits a corresponding and similar action of the throw crank 15. The stud 20 has a groove and flange construction to permit its travel along a slotted bottom plate 23 of the throw crank 15, and a like construction to permit scriber arm 18 to travel an equal distance in the same direction along the slotted top plate 22. The groove in stud 20 permits throw crank 15 to turn around shaft 17. The flanges and grooves of bearing studs 19 and 20 keep the bottoms of the throw cranks 14 and 15 equi-distant from the top of the scriber arm 18 at all times.

The relative motion of the scriber arm 18 with relation to throw cranks 14 and 15 is achieved by a knurled nut 24 which is the "major axis set nut." Attached to, and to turn with, this nut is a screw-threaded rod 25. Through the bottom of stud 20 there is a female thread. Studs 19 and 20, also vertical shaft 17 and ball bearing 31, are fast to and connected by a spacer bar 26, and move as a unit.

Figure 1:
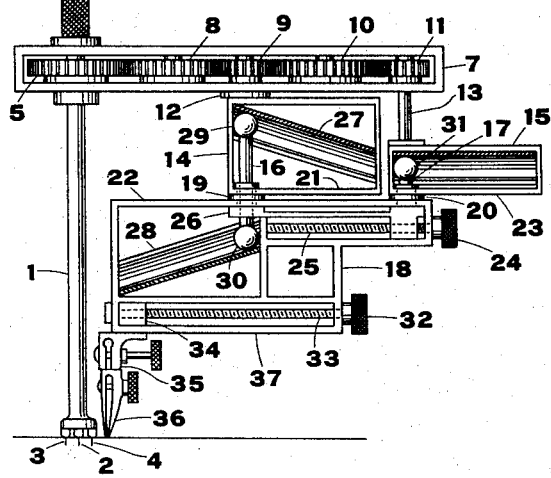
Fig. 1 is a side elevation of one conception of this ellipsograph compass showing its fundamental construction with settings for minor and major axes.

Contained in throw crank 14 there is an inclined tubular track 27 (here shown as a tube) slotted throughout its bottom to permit travel of the vertical shaft 16 therein. Contained in scriber arm 18 is a correspondingly inclined tube 28 of identical degree of inclination (but inclined in the opposite direction as per Fig. 1) slotted throughout its top to permit travel of vertical shaft 16 therein.

A slide ball bearing 29 at the top of the vertical slide shaft 16 and fast thereto, has a diameter to travel closely but without binding along the tubular track 27. A slide ball bearing 30 at the bottom of the vertical slide shaft 16 and fast thereto has a diameter to travel closely without binding through the tubular track 28. Fast to stud 20 is the vertical shaft 17, at the top of which and fast thereto is a slide ball bearing 31 with a diameter to travel closely in but without binding along the horizontal throw crank 15.

Tubular stud 19 permits vertical shaft 16 to rise or fall in it, when forced horizontally by the turning of set nut 24. Pivotal ball bearings 29 and 31 are always held firmly in position by screw rod 25.

As the major axis set nut 24 (attached to arm 18) turns a screw rod 25, arm 18 moves a distance to the right relative to shafts 16 and 17, and simultaneously ball 30 is forced down inclined plane 28, lowering shaft 16 and forcing ball 29 an equal distance down the inclined plane 27. This will carry shafts 16 and 17 the same distance to the right relative to center post 1, at the same time carrying arm 18 a second like distance to the right. Therefore, as the nut 24 is turned, shafts 16 and 17 will move from "neutral position" a distance from the center post along their respective throw cranks 14 and 15 while the scriber 36 is moving twice that distance from the center post.

Fast to nut 32 is a screw-threaded rod 33. A block 34 is female threaded. Block 34 has fixed to it a holder 35 in which the scriber 36 (pen, pencil, knife, etc.) is held. A bottom plate 37 of the scriber arm 18 is slotted throughout its length to permit the scriber holder 35 to travel horizontally from or toward center post 1 as knob 32 is turned.

For the single nut setting for drawing a circle, center the locating pin 2 at the intersection of major and minor axes, and set pins 3 and 4 along the major axis. Throw cranks 14 and 15 should be pointed away from the center post 1. Shafts 16 and 12 should be in alignment, as are shafts 17 and 13. To set for drawing a circle, nut 32 is turned to bring scriber 36 to the desired radius. Holding knob 38 and turning cylinder 6, the entire mechanism will revolve 360° about the center post 1 to scribe the desired circle. Shafts 16 and 17 are held by screw rod 25 at the axes of their throw cranks. Throw crank 14 will turn about ball 29 and throw crank 15 about ball 31, causing the scriber arm 18 to remain parallel with arm 7, and the scriber to turn.

For the nut setting for drawing an ellipse, set the instrument as above for drawing the circle. Holding knob 38 stationary and turning cylinder 6, the entire mechanism turns about center post 1 to 90°. Throw cranks 14 and 15 now point toward the center post with the scriber along the minor axis. Nut 32 is then turned until the scriber is at the end of the minor axis. Now the mechanism is turned 90° back to original position by turning cylinder 6 and holding the center post by knob 38. Nut 24 is then turned until the scriber is at the end of the major axis.

Another method of setting is by marking off a semi-minor axis on a semi-major axis. With the instrument as shown, Fig. 1, turn nut 32 and the scriber to the semi-minor axis; then turn nut 24 and scriber to the semi-major axis. Shafts 16 and 17 have moved from neutral position along their respective throw cranks 14 and 15 one-half the distance, in the same direction, that the scriber has moved from the semi-minor axis to the semi-major axis.

Holding knob 38 and turning cylinder 6, frame arm 7 and the entire mechanism is turned 90°. The throw cranks 14 and 15 will then bring the scriber 36 from one end of the major axis to one end of the minor axis. Continuing to 180°, the scriber is brought to the other end of the major axis, and at 270°, the scriber is at the other end of the minor axis. At 360°, the scriber is at the starting point of the major axis and has completed the ellipse.

After the scriber has been set as above for drawing the ellipse, see Fig. 2, center post 1 is centered by pin 1 and held stationary by pins 3 and 4. As arm 7 is turned counter-clockwise about sun gear 5 (fast to the center post), gear 8 turns counter-clockwise and gear 9 (with one-half as many teeth as gear 5) turns clockwise and gear 10 counter-clockwise and gear 11 clockwise. Shafts 16 and 17 are equi-distant from their crank axes and are connected by the scriber arm 18 which at all times will be parallel to arm 7. The scriber arm 18 and scriber 36 thus rotate, counter to, and at twice the angular speed of, its revolutional travel around center post 1, scribing the desired ellipse.

The nibs of the ruling pen will at all times be held 90° to the scribed surface, which is important in all compass type instruments, to prevent the pen riding on one nib with a resulting uneven or ragged line.

Figure 3:
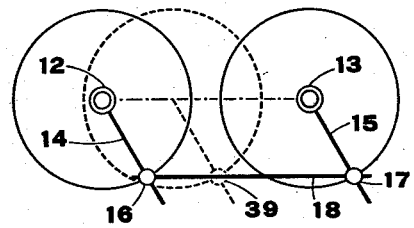
Fig. 3 is a diagrammatic plan view of the parallelogram showing the relative action on the connecting rod of two equal cranks in relation to the ellipsograph compass of Fig. 1.

Fig. 3 is a diagrammatic plan view showing the relative action at any point on the connecting rod of the four-bar linkage parallelogram mechanism as applicable to this invention.

The two cranks 14 and 15 connected at their axes 12 and 13, or equi-distant from shafts 16 and 17, at the same relative points and direction and turning at the same angular speed will impart the same speed and identical determinate motion at any point 39 on the connecting rod 18 as at points of connection. Any setting of shaft 16 from its axis 12 along crank 14 is therefore a similar setting on connecting rod 18, including extensions of the connecting rod.

Figure 4:
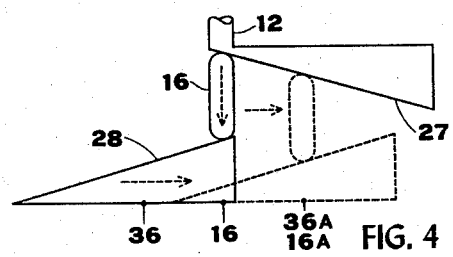
Fig. 4 is a diagrammatic side elevation showing the principle of inclined planes and wedges.

Fig. 4 is a diagrammatic side elevation showing the principle involved for setting the scriber from the semi-minor axis to the semi-major axis by means of a wedge and slide mechanism. A wedge (inclined tube 27) is fast to shaft 12. The point or scriber 36 is on wedge (inclined tube) 28. As tube 28 moves to the right, vertical slide 16 (held in firm position vertically as per Fig. 1) is forced down the inclined tubes 28 and 27 and also to the right. Scriber point 36 on wedge 28 moves to point 36A while shaft 16 moves exactly one-half the linear speed of point 36, so it will move to point 16A, the same point as 36A. Basically, scriber 36 moves the diameter while shaft 16 moves the radius of a determinate circle. As shafts 16 and 17 in cranks 14 and 15 are connected, Fig. 3, the axes of the parallelogram are thereby determined while by the same operation the scriber is moved to elliptical drawing position.

Figure 5:
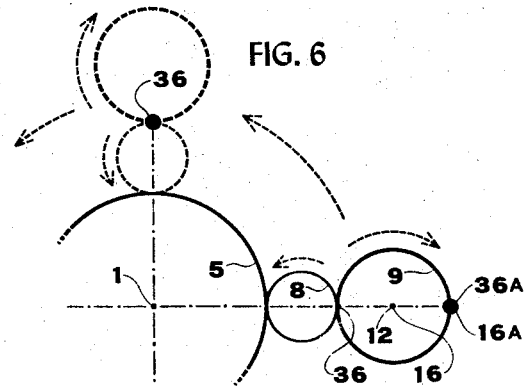

Fig. 5 is a diagrammatic side elevation showing the wedge setting having moved the scriber from the semi-minor axis to the semi-major axis Fig. 4. The scriber is mechanically returned to the semi-minor axis at 180° turn of wedge (tube) 27 in one-fourth of its kinematic cycle. Tube 27 pivots about the axis of shaft 12 to return scriber 36 from the semi-major axis (at point 36A Fig. 4) to the point of semi-minor axis 36 (Figs. 4 and 5). Wedge (tube) 27 will now face the opposite direction relative to wedge (tube) 28.

Figure 6:
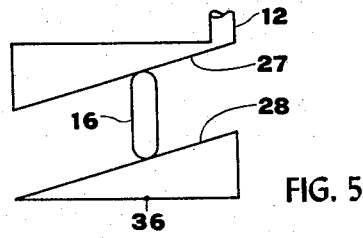
Figs. 5 and 6 are diagrammatic views illustrating certain adjustments.

Fig. 6 is a diagram in plan but showing only the first three gears 5, 8 and 9 of the five-gear train. In this invention, gears 10 and 11 are used in the spur gear train for obtaining the parallel linkage motion, see Fig. 3.

A point 36 on the radius of a circle away from its axis 12 revolving 360° around a fixed point 1 whose angular speed of rotation is twice that of its revolving travel and counter to it will scribe an ellipse.

This invention is based primarily on correlating three kinematic premises: the employment of any of which is new in an instrument to delineate ellipses:

No. 1. Four-bar linkage parallelogram mechanism to impart identical angular speed throughout the connecting rod (Fig. 3).

No. 2. The inclined plane and wedge principle modified to adjust the axis ratio of the parallelogram (Fig. 4).

No. 3. The action of two opposed wedges with a vertical slide between, one wedge moving horizontally will have twice the linear speed of the slide. (Fig. 4.)

Having thus described my invention and the advantages thereof, I do not wish to be limited to the details herein disclosed, otherwise than as set forth in the claims, but what I claim is:

1. An ellipsograph compass comprising a stationary vertical center post, a horizontal arm on and revolvable about the post, mechanism on the arm to scribe circles and all degrees of ellipses substantially to a straight line, said mechanism comprising two cranks attached to said arm at spaced points, means connecting said cranks to the center post and operable to turn said cranks at twice the angular speed as, and counter to, their revolution about the center post, said cranks being connected at selected spaced points on the arm, a scriber arm pivoted at spaced points to both cranks, and a scriber on the scriber arm.

2. The compass of claim 1 including means to adjust the scriber along the scriber arm.

3. The compass of claim 1 including means to adjust the scriber along the scriber arm, and means to adjust the scriber arm relative to the cranks.

4. An ellipsograph compass comprising a stationary vertical center post, a gear thereon, a horizontal arm revolvable about the gear, mechanism on the arm to scribe circles and all degrees of ellipses substantially to a straight line, said mechanism comprising two cranks attached to said arm at spaced points and facing in the same direction, gearing connecting said cranks operatively to the center post gear and operable to turn the cranks at twice the angular speed as, and counter to, their revolution about the center post, said cranks being located at selected relative points on the arm, a scriber arm pivoted to both cranks, and a scriber on the scriber arm, the latter forming a link of a four-bar parallelogram of which the horizontal arm is one link and the cranks form the other links.

5. An ellipsograph comprising a center post, a gear fixed thereto, a horizontal arm swingable on the post adjacent the gear, a gear train on the arm and operatively connected to the gear, a crank fixed to one of said gears and turnable therewith as the arm turns about the center post, a second crank fixed to another of said gears and turnable in the same direction as the first crank, a scriber arm pivoted to the cranks at spaced points corresponding to the spacing of the cranks on the horizontal arm, a scriber on the scriber arm, means to rectilinearly adjust the scriber along the scriber arm, means to adjust the position of the scriber arm relative to the cranks, and means to vary the effective lengths of the cranks.

6. An ellipsograph comprising a center post, a gear fixed thereto, a horizontal arm swingable on the post adjacent the gear, a gear train on the arm and operatively connected to the gear, a crank fixed to one of said gears and turnable therewith as the arm turns about the center post, a second crank fixed to another of said gears and turnable in the same direction as the first crank, a scriber arm pivoted to the cranks at spaced points corresponding to the spacing of the cranks on the horizontal arm, a scriber on the scriber arm, means to rectilinearly adjust the scriber along the scriber arm, means to adjust the position of the scriber arm relative to the cranks, an inclined guide in one crank, an inclined guide in the scriber arm, said inclined guides being substantially equal in length and relative degree of inclination but facing oppositely to each other, a member slidably received in part in both inclined guides and relatively moving along the guides as the scriber arm is adjusted.

7. An ellipsograph compass comprising a stationary vertical center post, a horizontal arm revolvable about the post, mechanism on the arm to scribe circles and all degrees of ellipses substantially to a straight line, said mechanism comprising two cranks attached to said arm at spaced points facing in the same direction, means connecting said cranks to the center post and operable to be turned thereby, a scriber arm pivoted to both cranks at spaced points, a scriber on the scriber arm, means to rectilinearly adjust the scriber along the scriber arm, means to adjust the position of the scriber arm relative to the cranks, and a single means to adjust the effective lengths of the cranks and the relative position of the scriber arm with respect to the cranks.

8. The compass of claim 7 wherein said single means acts to adjust the effective lengths of the cranks and the position of the scriber arm relative thereto simultaneously and to an equal amount.

References Cited in the file of this patent

UNITED STATES PATENTS

| | | |
|---|---|---|
| 1,623,348 | Kiefer | Apr. 5, 1927 |
| 2,411,718 | Feld | Nov. 26, 1946 |

FOREIGN PATENTS

| | | |
|---|---|---|
| 476,999 | Germany | May 29, 1929 |
| 281,463 | Switzerland | June 16, 1952 |